United States Patent [19]
Lemmens

[11] 3,751,017
[45] Aug. 7, 1973

[54] COOLING TOWER
[75] Inventor: Alphonse A. A. Lemmens, Brussels 18, Belgium
[73] Assignee: Societe Hamon Sobelco, S.A., Bruxelles, Belgium
[22] Filed: Apr. 23, 1971
[21] Appl. No.: 136,668

Related U.S. Application Data
[63] Continuation-in-part of Ser. No. 108,642, Jan. 21, 1971, abandoned, which is a continuation of Ser. No. 771,513, Oct. 29, 1968, abandoned.

[52] U.S. Cl. .......................... 261/111, 261/DIG. 11
[51] Int. Cl. ............................................... B01f 3/04
[58] Field of Search ............ 261/DIG. 11, 108–110, 261/113, 111

[56] References Cited
UNITED STATES PATENTS

| 836,702 | 11/1906 | Ostendorff | 261/DIG. 11 |
| 1,142,809 | 6/1915 | Grace | 261/DIG. 11 |
| 1,158,107 | 10/1915 | Coffey | 261/DIG. 11 |
| 2,306,047 | 12/1942 | Elmer | 261/DIG. 11 |
| 2,695,773 | 11/1954 | McGrath | 261/DIG. 11 |
| 2,898,097 | 8/1959 | Goldsmith et al. | 261/DIG. 11 |
| 3,031,173 | 4/1962 | Kohl et al. | 261/DIG. 11 |
| 3,189,329 | 6/1965 | Smith et al. | 261/DIG. 11 |
| 3,189,335 | 6/1965 | Fuller et al. | 261/DIG. 11 |
| 3,227,429 | 1/1966 | Renzi | 261/DIG. 11 |
| 3,329,271 | 7/1967 | Ward et al. | 261/DIG. 11 |
| 3,378,239 | 4/1968 | Engalitcheff, Jr. et al. | 261/DIG. 11 |

FOREIGN PATENTS OR APPLICATIONS

| 538,076 | 7/1941 | Great Britain | 261/DIG. 11 |
| 543,866 | 3/1942 | Great Britain | 261/DIG. 11 |
| 571,510 | 8/1945 | Great Britain | 261/DIG. 11 |

Primary Examiner—Tim R. Miles
Attorney—Stowell & Stowell

[57] ABSTRACT

A cooling tower employing a plurality of vertically arrayed reticulate frame elements formed of laths. Water falls on the various tiers and is contacted by air flowing generally upwardly and/or transversely. Rotation of the frames yields different fall/flow patterns.

11 Claims, 28 Drawing Figures

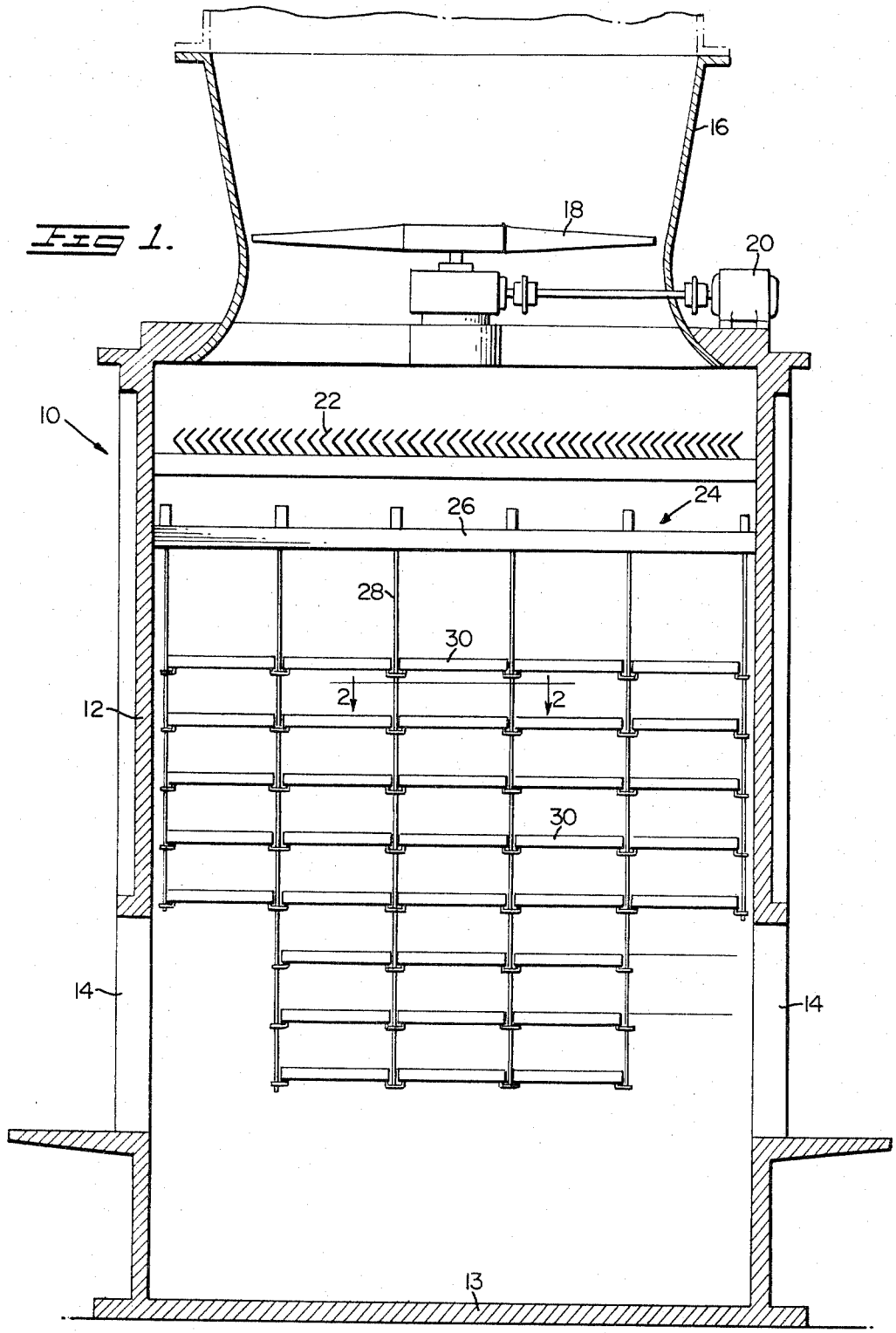

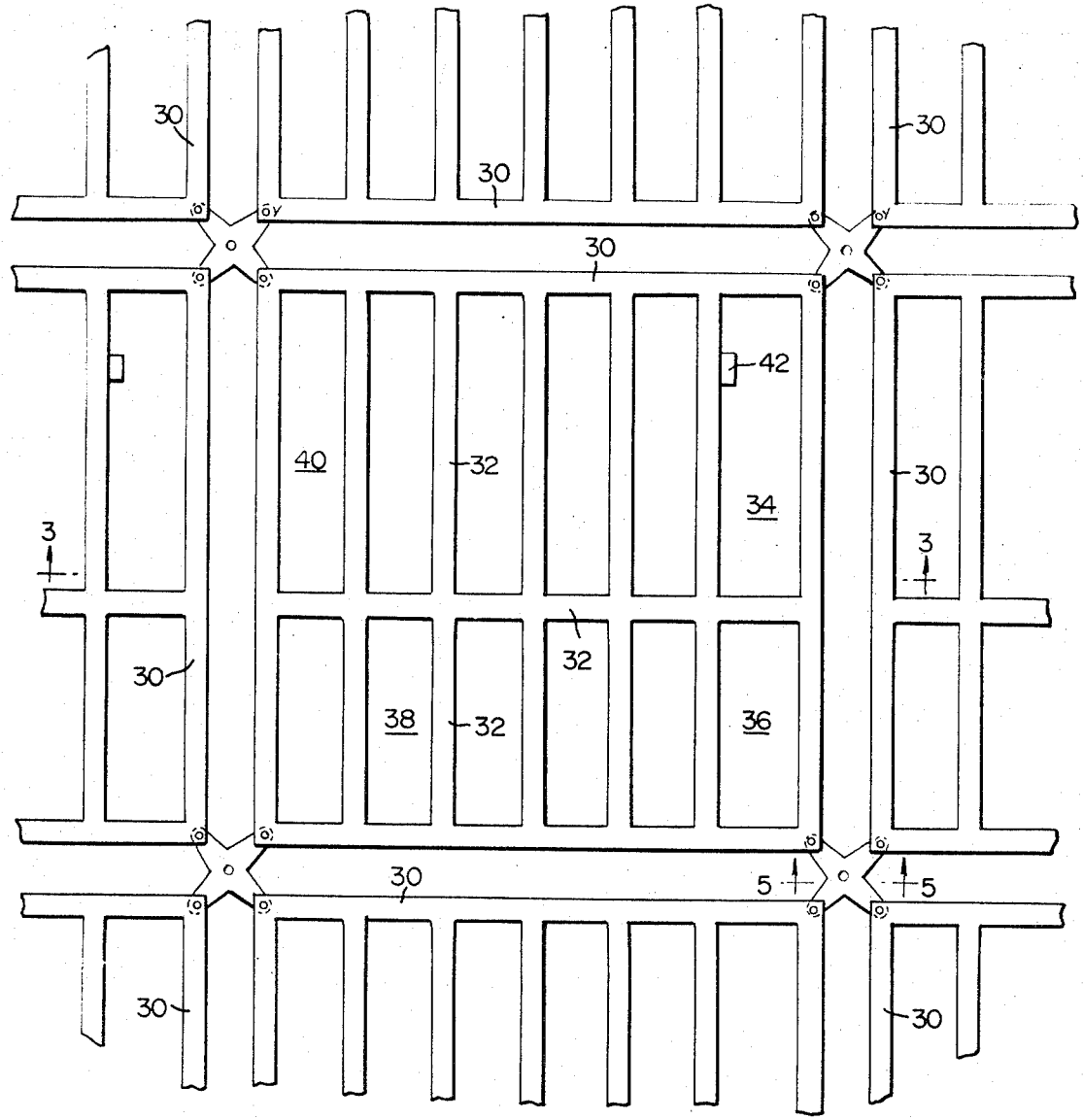
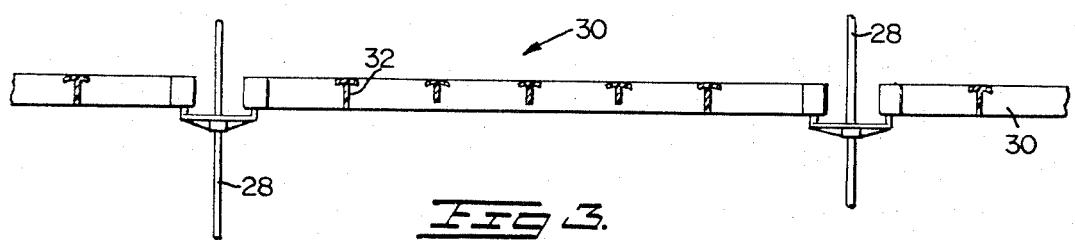

INVENTOR
ALPHONSE ALBERT ARTHUR LEMMENS

Stowell & Stowell
ATTORNEYS

PATENTED AUG 7 1973 3,751,017

INVENTOR
ALPHONSE ALBERT
ARTHUR LEMMENS

Stowell & Stowell
ATTORNEYS

INVENTOR
ALPHONSE ALBERT ARTHUR LEMMENS

INVENTOR
ALPHONSE ALBERT ARTHUR LEMMENS

Stowell & Stowell
ATTORNEYS

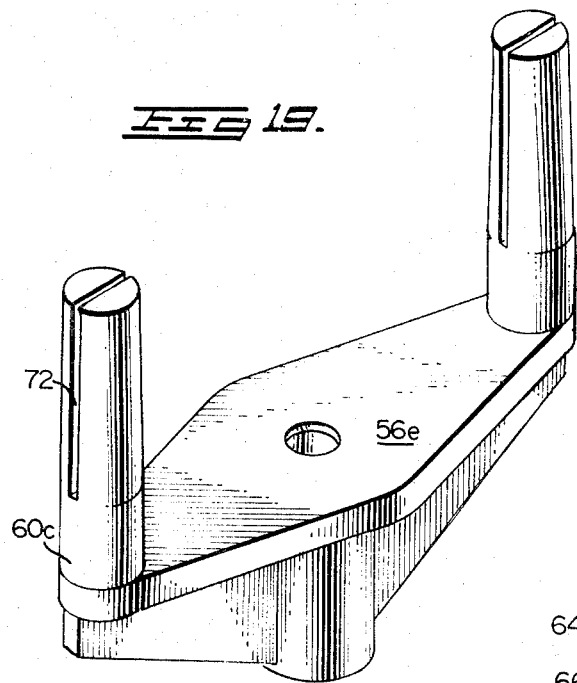
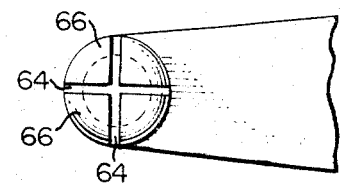
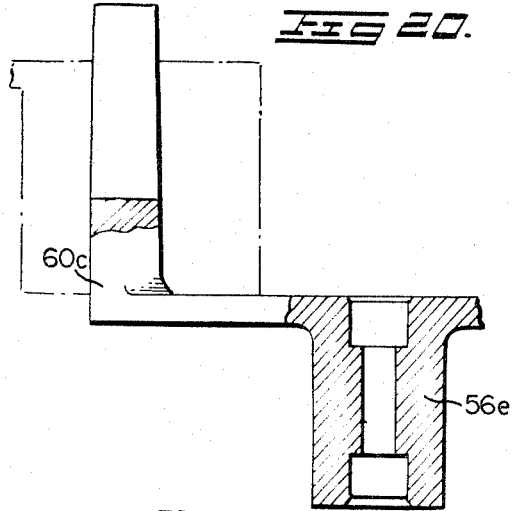
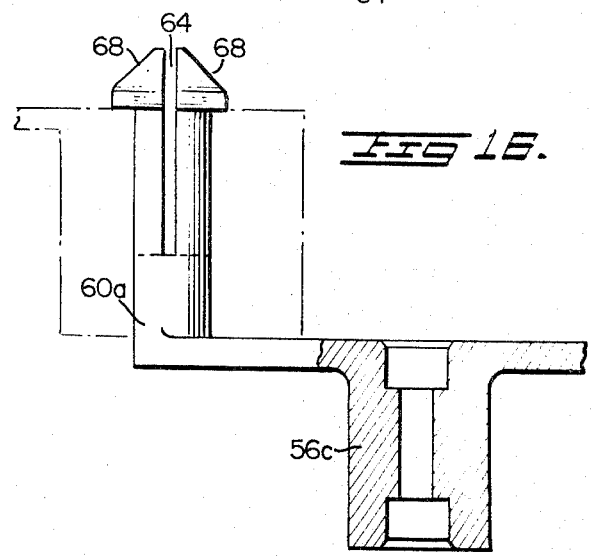
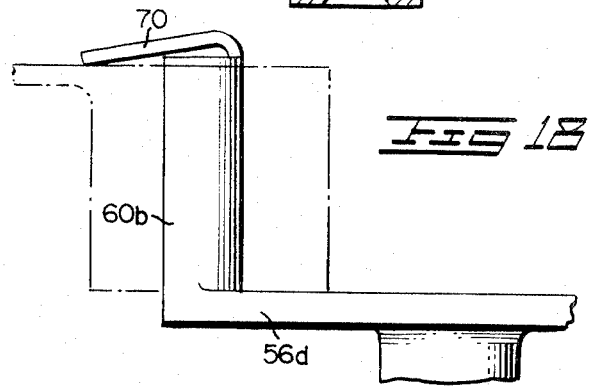
INVENTOR
ALPHONSE ALBERT ARTHUR LEMMENS
Stowell & Stowell
ATTORNEYS

INVENTOR
ALPHONSE ALBERT ARTHUR LEMMENS

BY *Stowell & Stowell*

ATTORNEY

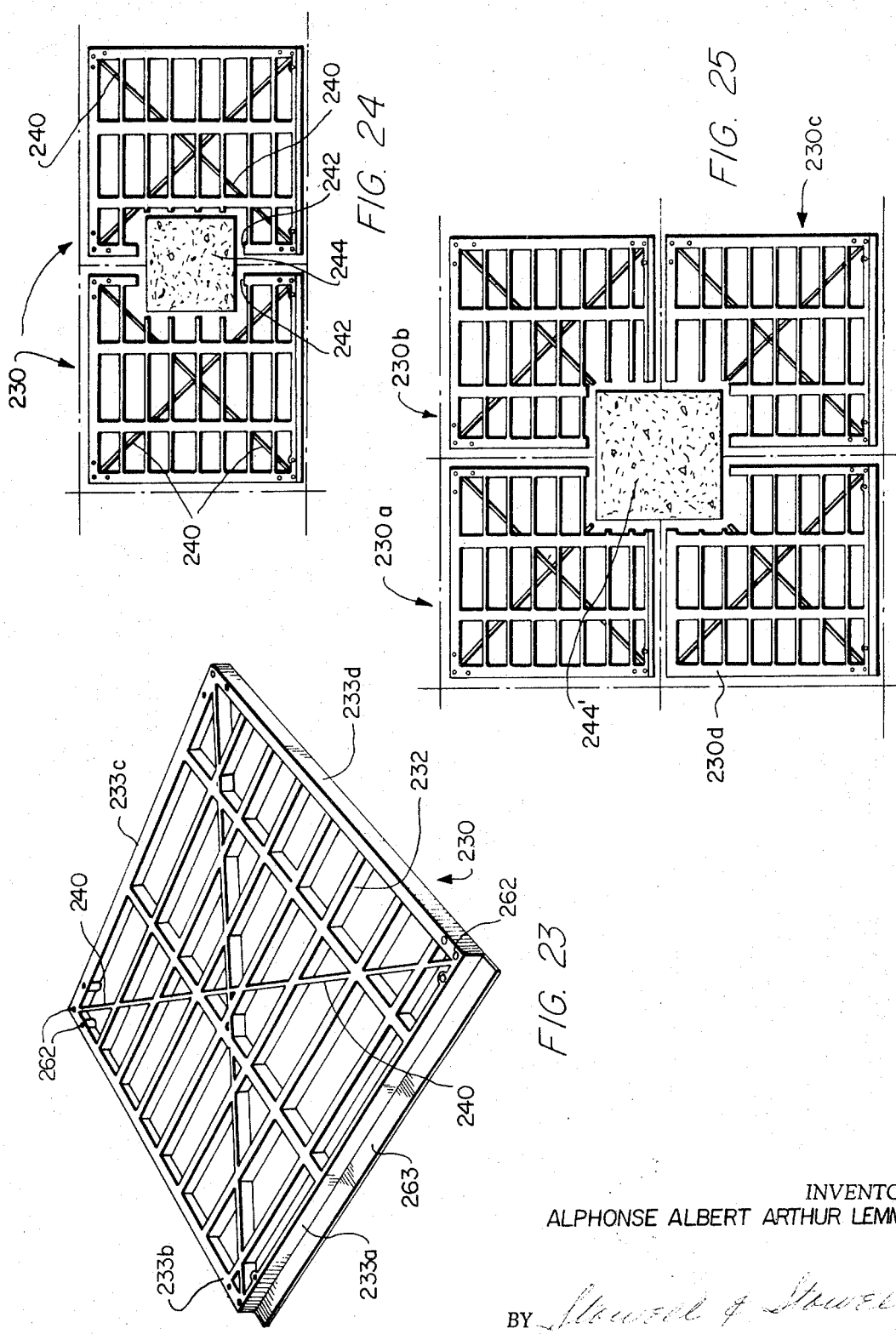

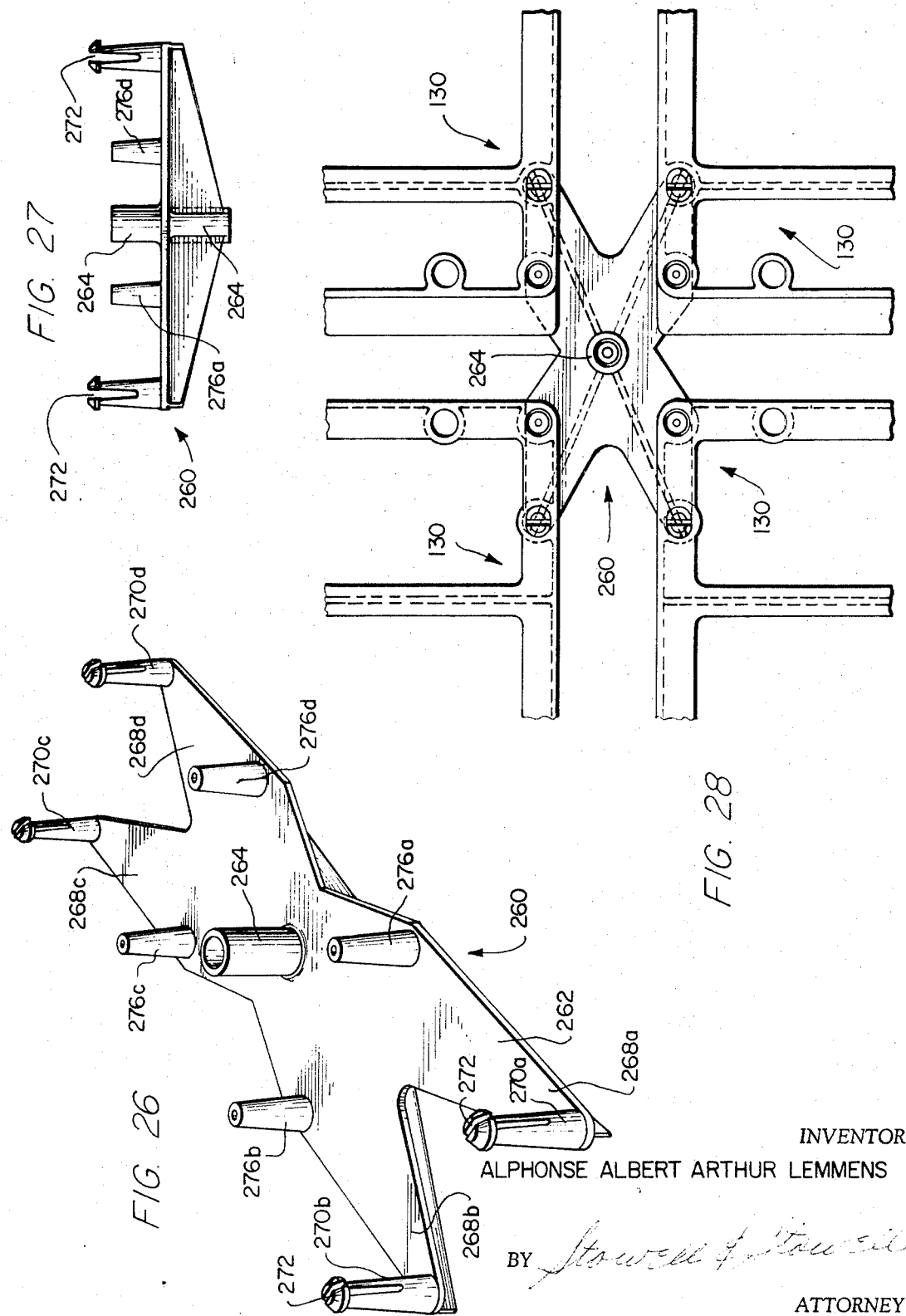

COOLING TOWER

This application is a continuation-in-part application of application Ser. No. 108,642, filed Jan. 21, 1971, now abandoned, which is a streamlined continuation of application Ser. No. 771,513, filed Oct. 29, 1968, now abandoned.

This invention relates to heat transfer apparatus and pertains to what is known as cooling towers wherein liquid to be cooled flows downwardly within the tower over a grid or lattice structure, whereby liquid is dispersed and upward and/or transverse movement of air removes heat from the downwardly moving liquid. The invention more specifically pertains to the structural features of a reticulate grid array for such atmospheric cooling towers. Atmospheric cooling towers often include heat exchange surfaces on which a liquid to be cooled flows or laths on which the liquid falls and from which it splashes in droplets onto other laths, and so on, until the liquid reaches the lowest part of the cooling tower. During this time, a flow of air contacts the exchange surfaces in the first case, or the laths and the droplets in the second case.

For the cooling towers of the latter type, wooden laths are often used, although installations may be found with splashing systems of plastic, asbestos cement and other materials, These wooden laths or laths of other materials are often laid down, attached or embedded in supports consisting of beams or horizontal supporting strucgures, or in wire neetings of protected metal or of plastic. These are sometimes included in panels lying on beam supports. These panels may also be stacked one on top of the other, the lower panels resting on beams.

According to the practice of this invention, a cooling tower includes a system of laths for a splashing type array, the system consisting of a series of rectangular frames incorporating laths. Each of the frames is fixed at its corners to support brackets themselves strung on threads. The supports are held at the desired vertical spacing by tubes strung on the thread. The resulting structure is very light, easy to assemble and avoids the usual more costly supports of various kinds in different types now employed in cooling towers.

Each frame has a series of parallel laths which are parallel to one of the sides of the frame and a rotation of a frame by 180° relative to a vertical neighbor yields a lath staggering. Thus an array with a double staggering can be achieved, which is favorable to the thermal exchange between the liquid and the air.

Each or some of the frames may include a diagonal bracing to increase the frames rigidity, particularly when a frame is coped to avoid interference with a tower or the like structural member.

Further each frame may include an outwardly extending lip to eliminate, or greatly reduce, water sneakage through the vertical corridors now existing in prior art packed towers.

The rectangular frames are usually made of an injected plastic material. This also applies to the support brackets. The threads are preferably made of stainless steel as are the clamps. The spacing tubes are of plastic such as polyvinyl-chloride.

The materials may also be different from those mentioned above and may be metal support parts, metal spacing tubes, frames of various materials including alloys and plastic materials,

IN THE DRAWINGS

FIG. 1 is an elevational cross-section of a cooling tower containing a reticulate array of vertically disposal lath frames.

FIG. 2 is a view of lath frames taken along section 2—2 of FIG. 1.

FIG. 3 is an elevational view of the frames shown in FIG. 2, taken along line 3—3.

Figure 8:
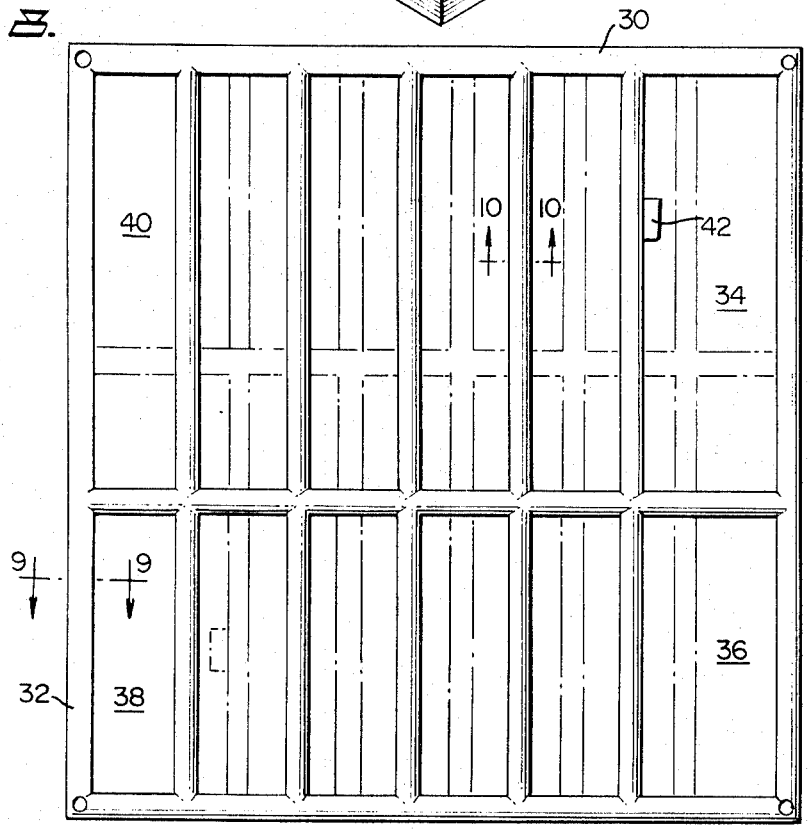
FIG. 8 is a plan view showing one relation of two vertically adjacent lath frames, the lower being shown in dashed lines.
Figure 9:
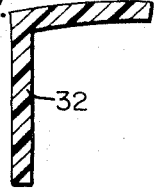
Figure 10:
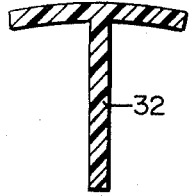

FIGS. 9 and 10 are enlarged cross-sectional views, along sections 9—9 and 10—10 of FIG. 8, showing the cross-section of the illustrated lath elements.

Figure 11:
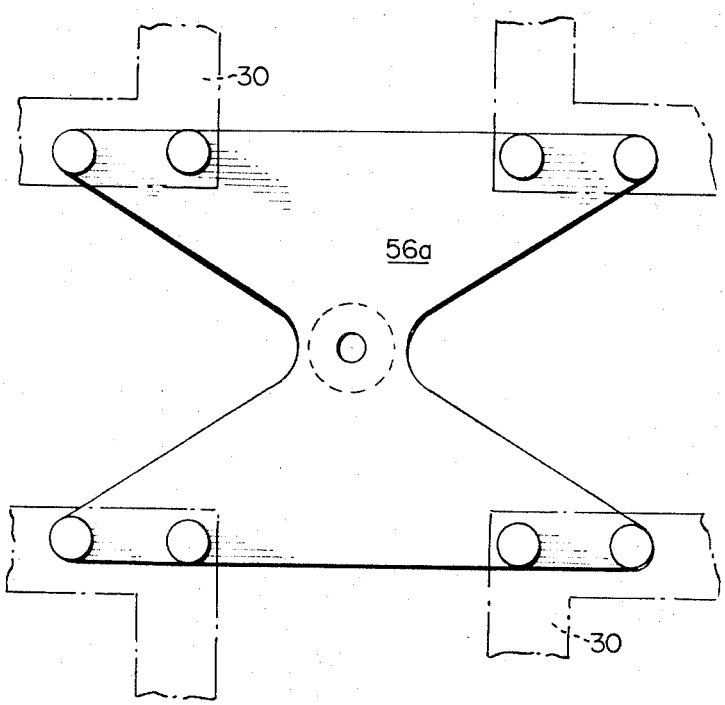
Figure 12:
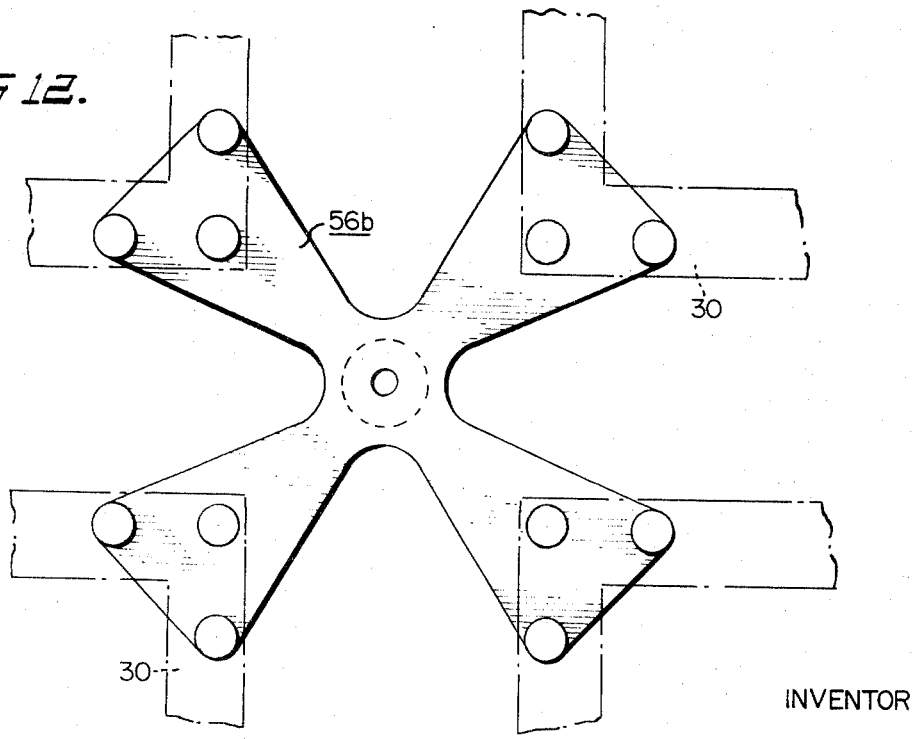

FIGS. 11 and 12 are plan views of modified support brackets.

Figure 13:
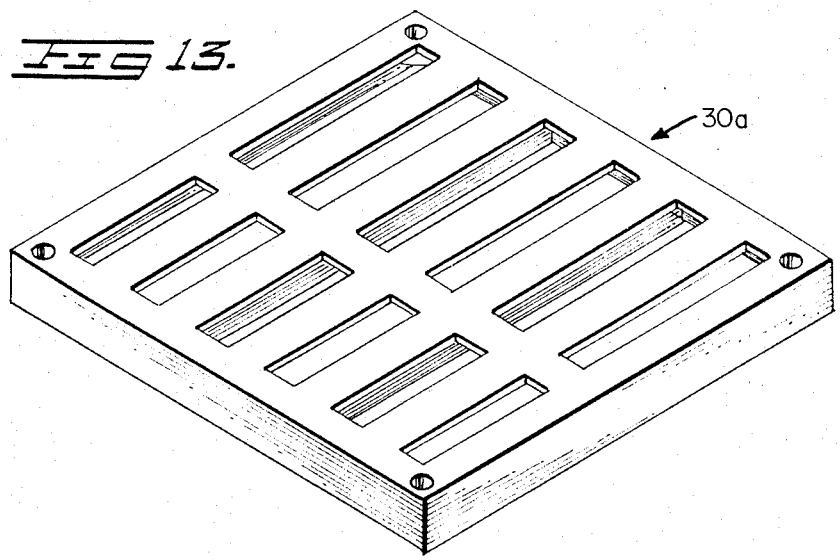

FIG. 13 illustrates an embodiment of a lath frame member, provided with a continuous annular reinforcing element.

Figure 14:
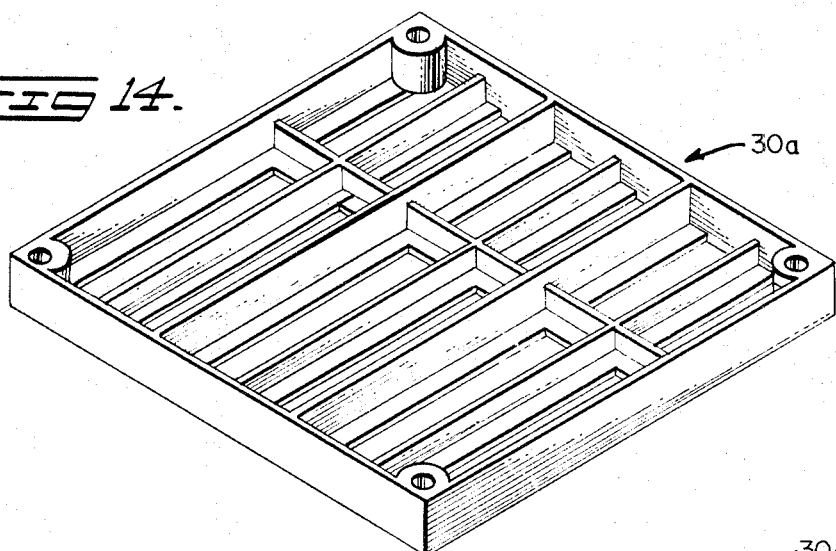

FIG. 14 is a view showing the underside of the frame shown in FIG. 13.

Figure 15:

FIG. 15 is an elevational cross-sectional view of the device shown in FIG. 13.

FIG. 16 is a partial cross-sectional view of a support bracket, illustrating an embodiment wherein the upstanding pegs are longitudinally split and enlarged.

FIG. 17 is a plan view of a portion of FIG. 16 illustrating a detail of the peg.

FIG. 18 is a view similar to FIG. 16, showing an embodiment.

FIG. 19 is a view showing a support bracket for lath frames adjacent the sides of the cooling tower of FIG. 1.

FIG. 20 is a partial cross-sectional view of the bracket of FIG. 19.

Figure 21:
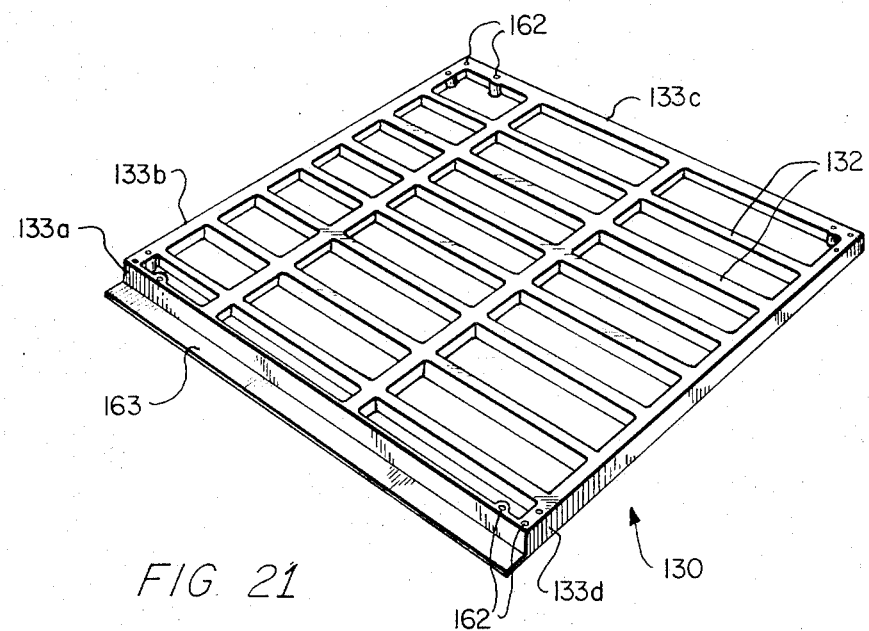

FIG. 21 is a perspective view of a modified modular frame lath member with an outwardly extending lip along one lateral side edge.

Figure 22:
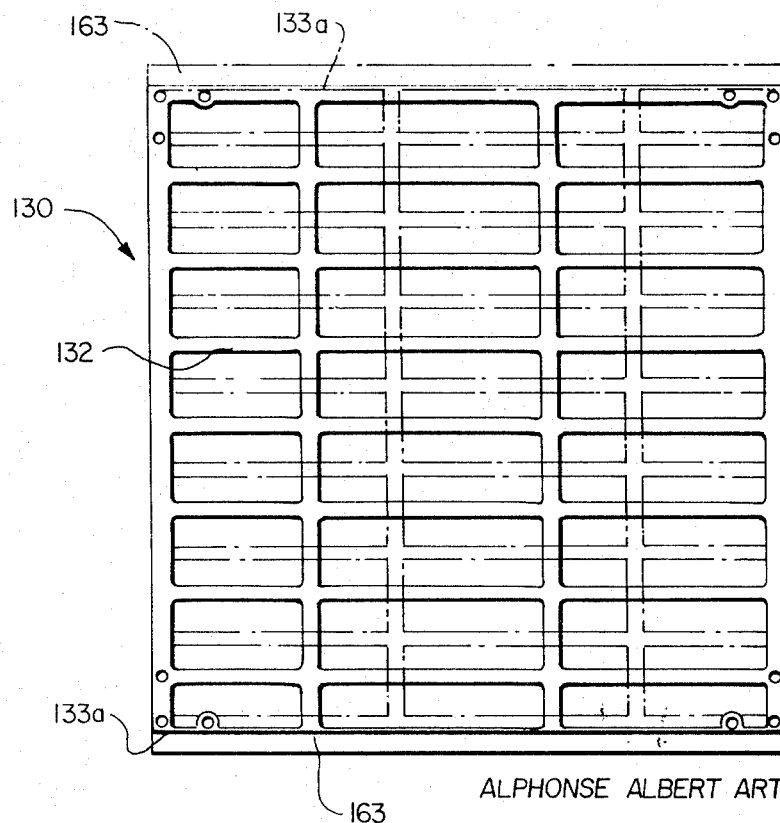

FIG. 22 is a plan view showing one relation of two vertically adjacent modified lath frames, the lower being shown in dashed lines.

FIG. 23 is a perspective view of another modified form of modular frame lath member with diagonal bracing.

FIG. 24 is a plan view of a pair of side-by-side modular frames with positions coped to avoid a structural member.

FIG. 25 is a plan view of a group of side-by-side modular frames with corner portions coped to avoid a structural member.

FIG. 26 is a perspective view of a modified form of support bracket for the frames.

FIG. 27 is an end view of the support bracket shown in FIG. 26.

FIG. 28 is a fragmentary plan view of the support bracket shown in FIGS. 27 and 28 in supporting relation to four modular frames.

Referring now to FIG. 1 of the drawings, the numeral 10 denotes generally a cooling tower of the type often employed in conjunction with air conditioning systems. The numeral 12 denotes vertical walls of the tower rising from base 13. A plurality of apertures 14 are provided in the lower portions of the walls 12 for the intake of atmospheric air. An upstanding nozzle 16, which sometimes supports extensions as indicated in the dotted lines, is located at the top of the tower and a fan 18 positioned in the throat. The numeral 20 denotes a motor for actuating the fan, while the numeral 22 denotes a baffle type separator to prevent the loss of large amounts of water from the cooling tower.

The numeral 24 denotes generally an array of vertically stacked lath frame elements, supported by crossbeam members 26, themselves in turn supported by the walls 12 of the tower. The numeral 28 denotes any one of a plurality of downwardly extending flexible rope or cable elements which support the lath frame elements 30.

Before proceeding with a discussion of the construction of the array 24, it will be observed that the general mode of operation of the cooling tower is as follows. The fan 18 is actuated and draws air in through the lower apertures 14 and upwardly through the tower. The air exits through the nozzle 16 and through any stack elements above it to the atmosphere. Water at relatively high temperatures is fed into the top of the tower in any convenient manner, not illustrated. The water falls under the action of gravity through the array 24 and is collected at the bottom of the tower. During its descent, the water is contacted by the upwardly flowing atmospheric air. The air being at a lower temperature, accordingly, cools the water and the water is now reintroduced into the air conditioning system at a lower temperature than that at which it entered the cooling tower.

Referring now to FIGS. 2, 3, 7 and 8 of the drawings, the numeral 30 denotes any one of a plurality of vertically stacked lath frames. Each frame is defined by a plurality of integral lath elements 32 preferably formed of plastic. In general, the interior of a rectangular lath frame 30 is defined by a plurality of rectangular openings of different sizes. The first size is denoted by the numeral 34, the second by the numeral 36, the third by the numeral 38, and the fourth type by the numeral 40. As shown at FIG. 2, for example, the openings 34 and 36 are of the same width but of different lengths. Similarly, the openings 38 and 40 are of the same width but of different lengths. The width of opening 34 is greater than the width of opening 40. Reference now to FIG. 8 of the drawings will illustrate that by virtue of this difference in widths of openings 34, 36 and 38, 40, rotation of a frame element 180° from the solid line showing of FIG. 8 will place it in the dotted position. One of the lath elements defining the opening 34 is provided with an integral tab 42 to function as a marker or guide. When the lath frame elements 30 are assembled, the pointing or positioning of the guide 42 in one orientation is indicative of the orientation of the particular frame to which it is secured. In this manner, the hand assembly of the various frames 30 in a single horizontal plane, for example, is facilitated by merely placing the various tabs 42 of the different frames 30 in homologous (corresponding) positions. Reference to FIGS. 9 and 10 of the drawings illustrates that the top portions of the lath elements 32, both the peripheral and intermediate laths, are slightly convex. This produces an enhanced splashing action as the water falls downwardly, it further strengthens the lath elements and also preserves the splashing or breaking up behavior even though they may be deformed for some reason.

Reference to FIGS. 1 and 3 of the drawings shows that the frames 30 are supported in vertical tiers by flexible rope elements 28. These are preferably formed of stainless steel and are strung within a plurality of spacing tubes 50, the latter preferably formed of a plastic such as polyvinyl chloride. The very end of each depending stainless steel thread 28 is provided with a clamp, not illustrated, for supporting the tiers immediately above it. The spacing tube elements fit into complementary recesses 52 and 54 of support brackets.

Figure 6:
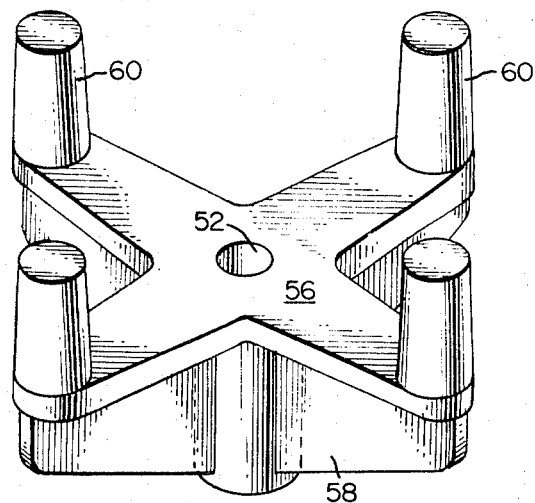
FIG. 6 is a perspective view of the support of FIG. 4.
Figure 5:
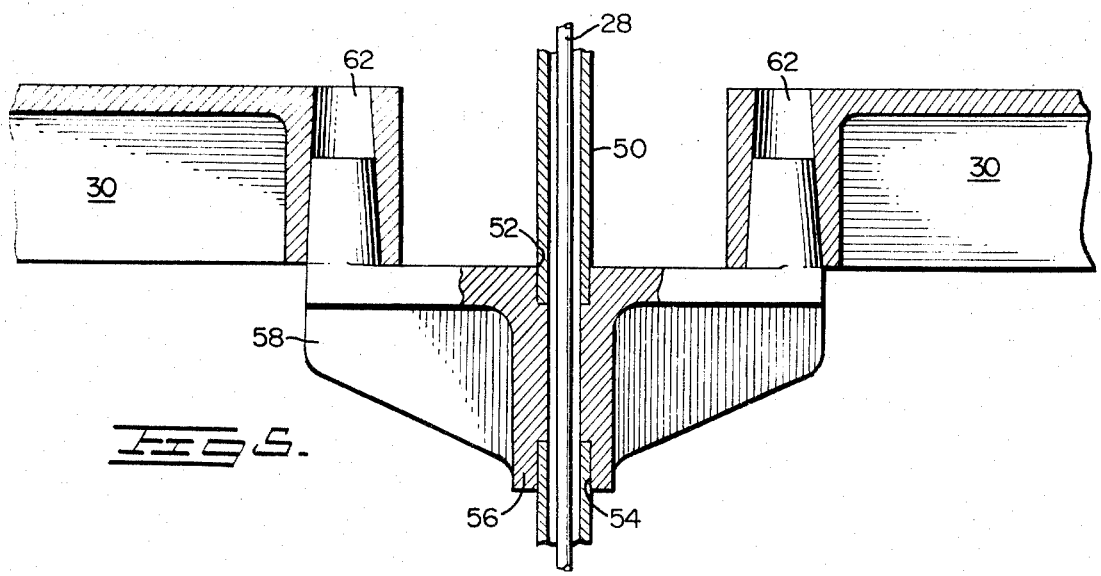
FIG. 5 is a cross-sectional view taken along line 5—5 of FIG. 2.
Figure 4:
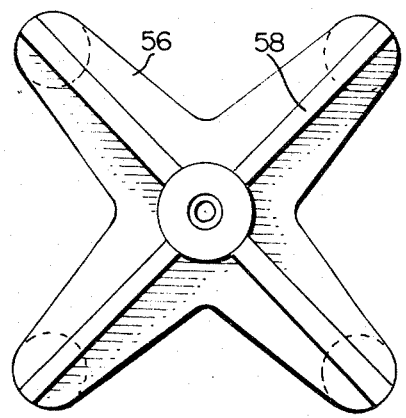
FIG. 4 is a bottom plan view of a support bracket for the frames.
Figure 7:
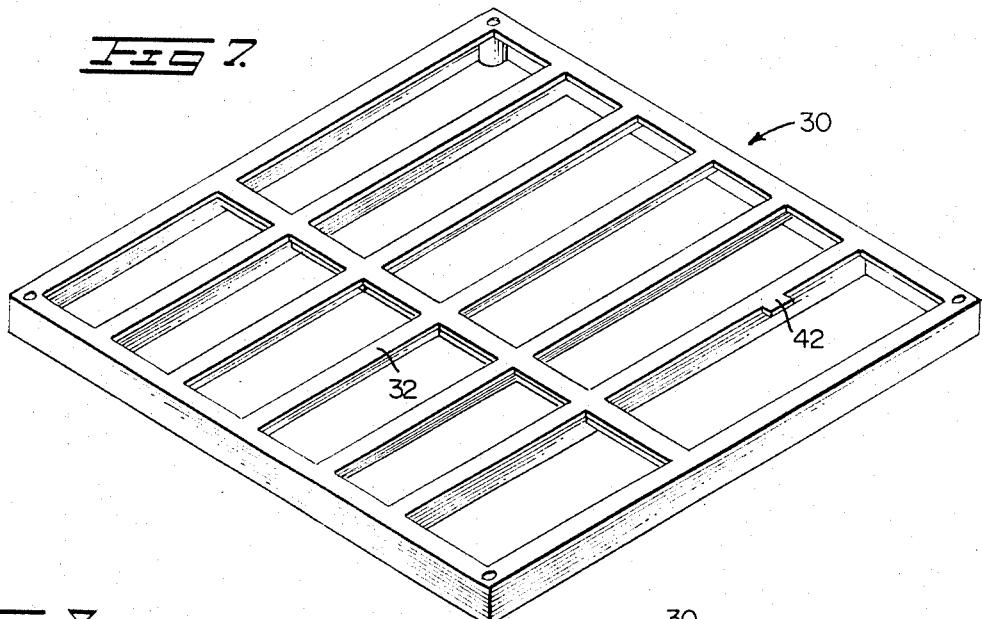
FIG. 7 is a perspective view of one of the modular frame lath members shown at FIG. 2.

The latter is provided on the underside, as illustrated at FIGS. 4 and 5, with reinforcing webs 58 for increased structural strength. Each bracket carries four radially extending arms, the outermost portion of each integrally carrying an upstanding and tapered peg 60, as illustrated at FIG. 6. As illustrated at FIG. 5, each peg fits into a complementary tapered recess 62 integrally formed in the corner of each of the lath frame elements 30. Preferably, both the support brackets 56 and frame elements 30 are formed of the same type of plastic so that there will be no relative expansion or contraction of one over the other to cause misalignment of parts or difficulty in assembly or disassembly or destruction by stresses due to differential thermal dilation.

Reference to FIG. 11 of the drawings illustrates a modification wherein each of the support brackets is provided with a pair of pegs at each of the arm ends. This bracket is illustrated by the numeral 56a. Similarly, FIG. 12 of the drawings illustrates another modification wherein each of the support brackets, here denoted by the numeral 56b, is provided at the outermost portion of its arms with three upstanding pegs. It is to be noted that the embodiments of FIGS. 11 and 12 will yield reticulate arrays of greater stability than in the case where a single peg only is used at the outermost part of each arm.

From the above discussion and description, it will be apparent that the lath frame elements 30 have the property of forming vertically non-aligned projections relative to each other on parallel planes as indicated at FIG. 8 of the drawings. In this relationship to each other, the individual lath elements 32 form a staggered or zig-zag relation to each other, with reference to a vertical plane. Thus, alternate or successive frames in the vertical tiers may be oriented so that corresponding elements 32 lie in the same vertical plane, or that corresponding elements, referred to a vertical plane, are in a zig-zag relationship. This latter condition obtains when a frame such as that illustrated at FIG. 2 of the drawings is rotated 180° from the illustrated position. It will be further observed that rotation of vertically adjacent frame lath elements 30 with respect to each other may be done through 90° and 270° as well as 180°. The utility of these rotational relationships between the various vertical frame levels is that diverse air and water flow conditions through the array 24, as well as various modes of distributing the liquid to be cooled over the array, may be effected to obtain maximum heat transfer and gas and liquid contact.

Referring now to FIGS. 13, 14 and 15, an embodiment of the lath frame elements is illustrated, the embodiment bearing the designation 30a wherein the peripheral skirt integral with the frame elements is made longer.

Referring now to FIGS. 16 and 17 of the drawings, a modification is indicated wherein the support bracket is provided with upstanding and integral peg elements having expansible and resilient locking tips. At FIGS. 16 and 17, numerals 56c illustrate such a modified bracket, the peg designated by the numeral 60a, and having a pair of vertical slots 64 at right angles to each other. This defines four segmented portions 66, each portion having an enlargement 68 integral therewith. For assembly, the complementary sockets of the frame element 30 are placed over the peg 60a and pushed downward, the canted sides of the enlargement 68 pushed and segments 66 draw together until the end of the socket is reached, the peg expanding, thus concluding the assembly.

FIG. 18 represents yet another embodiment wherein the support bracket, here designated by 56d, is provided at the outermost ends of the radially extending arms with integral and upstanding pegs 60b, the upper ends of the latter each provided with a flexible and integral tab 70. In operation, the tab 70 is bent in the illustrated position after assembly.

Referring now to FIGS. 19 and 20, yet another modification is illustrated. Here, the support bracket 56e is provided with only two upstanding peg elements, this being a bracket adapted to be used at one of the peripheral portions of the array 24. Each upstanding peg 60c is provided with a pair of vertical slots 72, and the other portion of the peg is slightly tapered as indicated.

Referring to FIG. 21, the lath frame 130 is composed of a plurality of lath elements 132 formed as a unit and having bounding edges 133a, b, c, and d with the corners provided with tapered peg receiving recesses 162. Each of the frames is provided with an outwardly extending flange 163 along side edge 133a. While a flange 163 is only illustrated along edge 133a, a similar flange may be placed along an adjacent edge 133b or 133d. Through the use of such modified lath frames, as more clearly shown in FIG. 22, the flanges eliminate the vertical corridors or passages which exist when prior art structures are vertically arranged in cooling towers, such corridors being located between adjacent panels. With the flanges of the improved frames, as the frames are rotated 180° or 90° the single flange or the pair of adjacent flanges effectively eliminate all such gas passages.

Referring in particular to FIGS. 23, 24, and 25, there is illustrated a further form of the improved lath frames of the invention which frames are generally designated 230. The frames 230 are composed of a plurality of lath elements 232 formed as a unit and having bounding edges 233a, b, c, and d with the corners provided with tapered peg receiving recesses 262. The frames may also be provided with an outwardly extending flange 263 along side edge 233a as described in reference to FIG. 21. While a flange 263 is only illustrated along edge 233a, a similar flange may be placed along an adjacent edge 233b or 233d.

Each of the frames 230 is provided with diagonal lath elements 240 having the same or generally the same shape as the other slats 232. The diagonals 240 provide the frames with additional rigidity or stiffness which stiffness is particularly important when the frames are cut in the vicinity of obstructions such as beams or columns frequently forming a part of the supporting structures for the shell of the cooling tower. In FIG. 24 each frame 230 is cut as at 242 to avoid the beam 244 and in FIG. 25 four frames 230a, b, c, and d have a corner removed to avoid beam 244'.

Now referring to FIGS. 26, 27, and 28, a modified frame support bracket 260 is illustrated. Each bracket 260 includes an extended planar surface portion 262 which is centrally provided with hollow tubular member 264 extending normally above and below the flat surface 262, through which passes the supporting steel or the like thread such as thread 28 shown in, for example, FIG. 5 of the drawings. The lower portion of the tubular element 264 and the flat surface 262 are strengthened by reinforcing webs 266 which correspond to webs 58 of the brackets shown in FIGS. 4, 5 and 6. The radial arm-like portions 268a, b, c, and d of each bracket 260 carry an integrally formed upstanding and tapered peg 270a, b, c, and d, respectively. Each peg 270a, b, c, and d has its upper end slotted as at 272 and the most extended end of each peg is provided with "locking" enlargements 274 as described in reference to FIGS. 16 and 17 of the drawings and for the same purpose. Further each bracket 260 is provided with four additional tapered pins or pegs 276a, b, c, and d. The illustration pins 276a, b, c, and d are not slotted or locking pins, however, they may be identical with pegs 270a, b, c, or d.

As illustrated in FIG. 28, a bracket 260 supports one corner of each of four frames 130 such that each frame receives one locking peg 270 and one non-locking peg 276 whereby the assembly is very stable, with no tendency to move in directions in the plane of the FIG. 28 showing.

It will be observed that the horizontal planes defined by the frames may be vertically spaced from each other by the same amount, thus permitting the use of spacing tubes such as 50 of FIG. 5 of the same length. It will also be noted that the frames may be more numerous in certain zones of the cooling tower than in other zones, to thereby effect greater gas-liquid contact in those zones where the gas density may be highest such as at or adjacent to the air inlet or inlets into the cooling tower.

I claim:

1. A liquid cooling tower construction including:
   a. a casing having an air inlet aperture in a side wall thereof,
   b. an array of reticulate frame members in vertical stacks and horizontal planes within said casing and positioned generally inwardly of said air inlet aperture,
   c. said frame members supported by vertically extending flexible members,
   d. support brackets vertically positioned along said flexible members,
   e. each said support bracket provided with a plurality of vertically extending pegs,
   f. said pegs extending into complementary sockets in said frames.

2. The liquid cooling tower construction of claim 1 wherein:
   a. each of said pegs releasably snaps into said frame sockets.

3. The liquid cooling tower construction of claim 1 wherein:
   a. each of said frames carries a plurality of sockets at its corners which receive the said pegs.

4. The liquid cooling tower construction of claim 1 wherein:
  a. said support brackets are vertically spaced from each other by tubes through which said flexible members pass.

5. The liquid cooling tower construction defined in claim 1 wherein at least one side of each frame is provided with a laterally extending flange.

6. The liquid cooling tower construction defined in claim 1 wherein each frame is provided with a laterally extending flange along a pair of adjacent sides.

7. The invention defined in claim 1 wherein each frame is further provided with diagonally extending lath elements.

8. The cooling tower construction of claim 1 wherein:
  a. the said frame members have openings and said openings are rectangular and are defined by a lath, parallel to two of the four frame sides, joining the remaining two parallel frame sides and intersecting a plurality of spaced parallel laths extending across the frame at right angles to the central lath.

9. The cooling tower construction of claim 8 wherein said laths are of generally T-shaped configuration in transverse cross-section, the upper surface of the T being convex with respect to the leg of the T.

10. The invention defined in claim 1 wherein each bracket includes a pair of pegs for each frame.

11. The invention defined in claim 10 wherein one peg of each pair releasably snaps into said frame sockets.

* * * * *